UNITED STATES PATENT OFFICE.

DUKE ROBERT RUSSELL, OF CHICAGO, ILLINOIS.

PROCESS OF MAKING HIGH-PERCENTAGE CALCIUM CARBID.

1,271,229. Specification of Letters Patent. Patented July 2, 1918.

No Drawing. Continuation of application Serial No. 215,406, filed February 4, 1918. This application filed March 25, 1918. Serial No. 224,648.

*To all whom it may concern:*

Be it known that I, DUKE ROBERT RUSSELL, a citizen of the United States, residing at Chicago, in the county of Cook and State of Illinois, have invented new and useful Improvements in the Process of Making High-Percentage Calcium Carbid, of which the following is a specification.

This invention relates to the process of making high percentage calcium carbid by a simple and inexpensive process.

This application is a continuation of my copending application Serial Number 215,406, filed Feb. 4, 1918.

It may here be stated that heretofore it has been a matter of common knowledge and understanding that 85 per cent. calcium carbid was about the greatest purity commercially possible in its production owing to the cost of purifying the carbon content used therein.

My process consists of making a special pitch coke, which consists of obtaining the pitch of distilled by-product coke-oven coal tar, preferably a pitch selected for its original purity, subjecting same to a purification process by distilling to the point of complete distillation, and to then coke the completely distilled pitch for about eight hours at a bright red heat, thus reducing the volatile matter to a minimum, and producing a pitch coke of very firm consistency, a carbon coke, that will not disintegrate upon long exposure, a pitch coke of 94 per cent. or better in fixed carbon content and otherwise of a high percentage of purity. This pitch coke I crush and mix with lime in proper proportions, insert electrodes in the admixture and smelt to high percentage calcium carbid.

It may here be stated that the use of the words high percentage in connection with calcium carbid is intended by the inventor to mean a calcium carbid of over 90 per cent. in purity and it may here be remarked that the materials used heretofore for the carbon content in the manufacture of said product for commercial use, carried such impurities that it was impossible to attain an average of over 85 per cent. purity for the production as a whole, this being true even when lime of very high purity analyzing 98 per cent. and better in calcium oxid was used therewith.

It may be here remarked that the matter of the purity of the materials used in calcium carbid manufacture is of such importance that although the percentage of impurities present in the materials may appear so minute as to be totally negligible, yet they undergo a process of concentration in the manufacture of calcium carbid that will have a distinct effect upon the acetylene generated from it, therefore the value of a high percentage calcium carbid lies not alone in an increased acetylene production per unit of calcium carbid but also in the purity of the acetylene gas itself.

I claim:

The process of making high percentage calcium carbid by the use of a pitch coke made of the pitch of completely distilled by-product coke oven coal tar, for the carbon content of a conglomerate of lime and carbon, inserting electrodes in said conglomerate and smelting to high percentage calcium carbid.

DUKE ROBERT RUSSELL.